US008095177B2

(12) United States Patent
Ida

(10) Patent No.: US 8,095,177 B2

(45) Date of Patent: Jan. 10, 2012

(54) WIRELESS COMMUNICATION DEVICE AND COMMUNICATION CONTROL METHOD

(75) Inventor: Ichirou Ida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 440 days.

(21) Appl. No.: 12/344,322

(22) Filed: Dec. 26, 2008

(65) Prior Publication Data

US 2009/0275293 A1 Nov. 5, 2009

(30) Foreign Application Priority Data

Apr. 30, 2008 (JP) ................................. 2008-118340

(51) Int. Cl.
*H04B 7/26* (2006.01)
*H04B 5/00* (2006.01)

(52) U.S. Cl. .................. 455/552.1; 455/41.1; 455/553.1

(58) Field of Classification Search ................. 455/41.1, 455/41.2, 552.1, 509, 510, 511, 512, 513
See application file for complete search history.

(56) References Cited

U.S. PATENT DOCUMENTS

| | | | | |
|---|---|---|---|---|
| 6,177,861 | B1 | 1/2001 | MacLellan et al. | |
| 6,801,777 | B2 * | 10/2004 | Rusch | 455/452.2 |
| 7,082,316 | B2 * | 7/2006 | Eiden et al. | 455/519 |
| 7,181,024 | B1 | 2/2007 | Oba et al. | |
| 7,421,367 | B2 * | 9/2008 | Nye | 702/127 |
| 2002/0193076 | A1 * | 12/2002 | Rogers et al. | 455/66 |
| 2004/0092837 | A1 * | 5/2004 | MacGregor | 600/519 |
| 2006/0205423 | A1 * | 9/2006 | Blair et al. | 455/512 |
| 2008/0194925 | A1 * | 8/2008 | Alsafadi et al. | 600/301 |
| 2008/0228045 | A1 * | 9/2008 | Gao et al. | 600/301 |
| 2009/0023391 | A1 * | 1/2009 | Falck | 455/41.2 |

FOREIGN PATENT DOCUMENTS

| | | |
|---|---|---|
| JP | 2000-049656 | 2/2000 |
| JP | 2001-144662 | 5/2001 |
| JP | 2003-163644 | 6/2003 |
| WO | WO 2006087670 A1 * | 8/2006 |
| WO | WO 2007096810 A1 * | 8/2007 |

* cited by examiner

*Primary Examiner* — Howard Williams

(74) *Attorney, Agent, or Firm* — Katten Muchin Rosenman LLP

(57) ABSTRACT

A wireless communication device includes a first wireless unit a first wireless unit processing a first radio signal propagated through a space; a second wireless unit processing a second radio signal propagated along the surface of a human body or in the human body; and a control unit selecting, as a present radio signal, any one of the first radio signal and the second radio signal, and controlling the first wireless unit and the second wireless unit so as to process the present radio signal.

12 Claims, 11 Drawing Sheets

WIRELESS COMMUNICATION DEVICE AND COMMUNICATION CONTROL METHOD

CROSS-REFERENCE TO RELATED APPLICATIONS

This application claims the benefit of Japanese Patent Application No. 2008-118340 filed on Apr. 30, 2008 in the Japanese Patent Office, the disclosure of which is herein incorporated in its entirety by reference.

FIELD

The present invention relates to a wireless communication technology using a human-body propagation channel.

BACKGROUND

A near-distance wireless communication network configured by sensor devices for acquiring biological information and a gateway device for collecting items of biological information from the sensor devices and transmitting the biological information to another network, is called a body area network (BAN) as the case may be. A BAN-utilized scheme enables realization of an application for making a medical check more efficient in a medical institution by constantly-conducting measurements of the biological information such as a heart beat and a body temperature or an application for enriching a health care outside the medical institution.

FIGS. 9 and 10 are diagrams each illustrating an outline of the BAN system. Main items considered as a communication technique for the BAN are a technique (refer to, e.g., Patent document 1 given below) of utilizing, as a propagation channel, a space distanced from a human body as illustrated in FIG. 9 and a technique (refer to, e.g., Patent documents 2 and 3 given below) of utilizing the human body as the propagation channel as illustrated in FIG. 10. Hereinafter, the former technique is termed an aerial communication, while the latter technique is termed a human-body communication. The human-body communication includes a technique of making use of a change of currents in a human body, a technique of utilizing an electric field on the surface of the human body, etc.

An example of the aerial communication shown in FIG. 9 is that respective sensor devices 901, 902 perform wireless communications by use of antennas 903, 904. An example of the human-body communication shown in FIG. 10 is that respective sensor devices 911, 912 perform the wireless communications by use of, e.g., electrodes 913, 914 attached to the human body.

It is general that a frequency zone for use in the BAN system using the aerial communication ranges from several hundred mega hertz (MHz) through several Giga hertz (GHz), and by contrast the BAN system using the human-body communication involves employing a frequency zone equal to or lower than 10 (MHz) corresponding to a characteristic of the propagation channel.

[Patent document 1]: Japanese Patent No. 3708354

[Patent document 2]: Japanese Patent No. 3707463

[Patent document 3]: Japanese Laid-Open Patent Publication No. 2001-144662

SUMMARY

In the BAN system using the aerial communication or the human-body communication described above, however, as shown in FIG. 11, a propagation environment of a specified frequency to be used is affected by an ambient environment and a proximal object and receives interference from other communication systems, with the result that fading occurs. FIG. 11 is a diagram showing an example of the fading which occurs in the conventional BAN system. A symbol "Pth" shown in FIG. 11 represents a threshold value of received power, in which a reception-disabled state occurs when a power value of a received signal is smaller than this threshold value.

In the example of FIG. 11, a value of the received power is lower than Pth in four time zones due to the fading, and the communications-disabled state occurs in the respective time zones. Thus, the conventional BAN system has a problem that the received power required for the communications can not be ensured, and there are the time zones in which the communications-disabled state occurs.

In the conventional BAN system, the occurrence of these communications-disabled time zones entails moving the human body itself as a target of the BAN system to a different place or removing influence of the proximal object. If the BAN system is used for the medical service etc, however, the target human body itself as in the case of a patient on a bed in the hospital is hard to move in many cases. In such a case, none of the countermeasures given above can be adopted.

As a matter of course, this problem arises likewise in a network in which wireless communication devices with less movements perform wireless communications with each other without being limited to the BAN system targeted at the human body.

Accordingly, it is an object of the embodiment, in view of the problems described above, to provide a wireless communication technology enabling wireless communications with continuously high reliability to be performed.

Each mode of the embodiment adopts the following configurations in order to solve the problems given above.

A first mode is related to a wireless communication device comprising: a first wireless unit processing a first radio signal propagated through a space; a second wireless unit processing a second radio signal propagated along the surface of a human body or in the human body; and a control unit selecting, as a present radio signal, any one of the first radio signal and the second radio signal, and controlling the first wireless unit and the second wireless unit so as to process the present radio signal.

As to a frequency band used for the first radio signal employing the space as the propagation channel and a frequency band used for the second radio signal employing the human body as the propagation channel, the former frequency band ranging from hundreds of megahertz (MHz) to several gigahertz (GHz) is largely different from the latter frequency band that is equal to or lower than 10 MHz. Hence, a correlation of the fading occurring in the respective frequency bands is low.

The wireless communication device according to the first mode includes the first wireless unit and the second wireless unit that process the radio signals as described above, and can therefore avoid the influence of the fading etc by selecting the second radio signal as the present radio signal in a time zone where a communication condition of the first radio signal is not acceptable.

Namely, according to the first mode, frequency diversity and, by extension, the wireless communications with the continuously high reliability can be realized by controlling the first wireless unit and the second wireless unit.

In the first mode, preferably, the control unit, after transmitting predetermined information by use of the present radio signal, if a reception acknowledgement signal of the predetermined information is not received, switches over the present radio signal to the other radio signal.

Further, the first mode, preferably, the wireless communication device further comprises an estimation unit estimating a reception state of the present radio signal, wherein the control unit, if the reception state value acquired by the estimation unit declines under a threshold value, switches over the present radio signal to the other radio signal.

Herein, the reception state can be estimated by using values of, e.g., received power, a signal to interference power ratio and a signal to interference plus noise power ratio. The case of "if the reception acknowledgement signal (ACK signal) is not received" connotes, for example, a case in which the predetermined information can not be normally received on the receiving side, and is said to be a case in which the reception state is not acceptable.

Therefore, this configuration enables the other communication system to be selected in the time zone where the communication condition of one communication system is not acceptable in a way that precisely grasps the communication states of the respective communication systems on the transmitting side and on the receiving side of the predetermined information.

Moreover, in the first mode, preferably, the control unit retains priority information for specifying any one of the first radio signal and the second radio signal as a priority radio signal, and, after switching over the present radio signal to the priority radio signal specified by the priority information at predetermined timing, controls the first wireless unit and the second wireless unit so as to process a test signal.

It is effective that the first radio signal is specified as the priority radio signal when a high transmission rate is requested, and the second radio signal is specified as the priority radio signal when low power consumption is requested. As described above, it is because the first radio signal has the higher frequency than the second radio signal has and therefore enables the high-speed transmission to be attained. Further, the first wireless unit for processing the high frequency signal has larger power consumption than the second wireless unit has. Hence, the low power consumption can be actualized by preferentially selecting the second radio signal.

This configuration enables the wireless communication with the continuously high reliability to be performed and further enables the high-speed transmission or the low power consumption to be realized according to the necessity.

It should be noted that another mode may be a communication control method for realizing any one of the configurations described above and may also be a program and further be a readable-by-computer recording medium recorded with this program.

According to the modes described above, it is feasible to provide the wireless communication technology enabling the wireless communications with the continuously high reliability to be performed.

DESCRIPTION OF EMBODIMENTS

A sensor device will hereinafter be described by way of each embodiment with reference to the drawings. Note that configurations in the following embodiments are exemplifications, and the embodiments are not limited to the configurations in the embodiments. Herein, the sensor device will be exemplified, however, a wireless communication device having only a wireless communication function without having a sensing function is also applicable.

Outline of Embodiment

To start with, as an item common to the respective embodiments, an outline of the embodiment will be explained.

Figure 1:
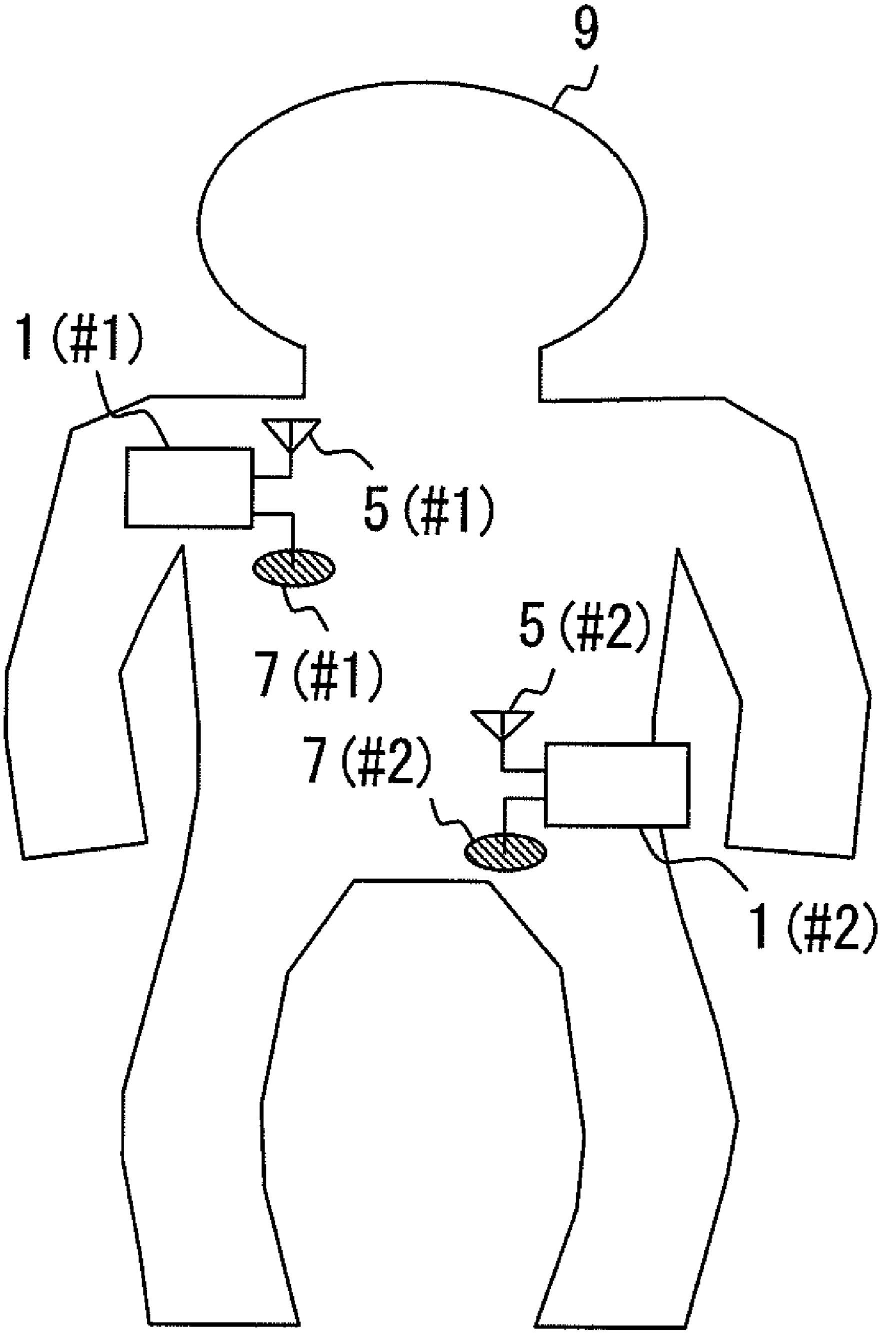
FIG. 1 is a diagram showing an example of an architecture of a BAN system.

FIG. 1 is a view showing an example of architectures of a BAN system. Sensor devices 1 (#1 and #2) in the present embodiment perform wireless communications with each other, thereby configuring the BAN system. The sensor devices 1 are attached to a human body 9 and measure, e.g., biological information. In the following discussion, the symbols (#1 and #2) are marked on the plurality of sensor devices 1 if necessary for distinguishing therebetween.

Figure 2:
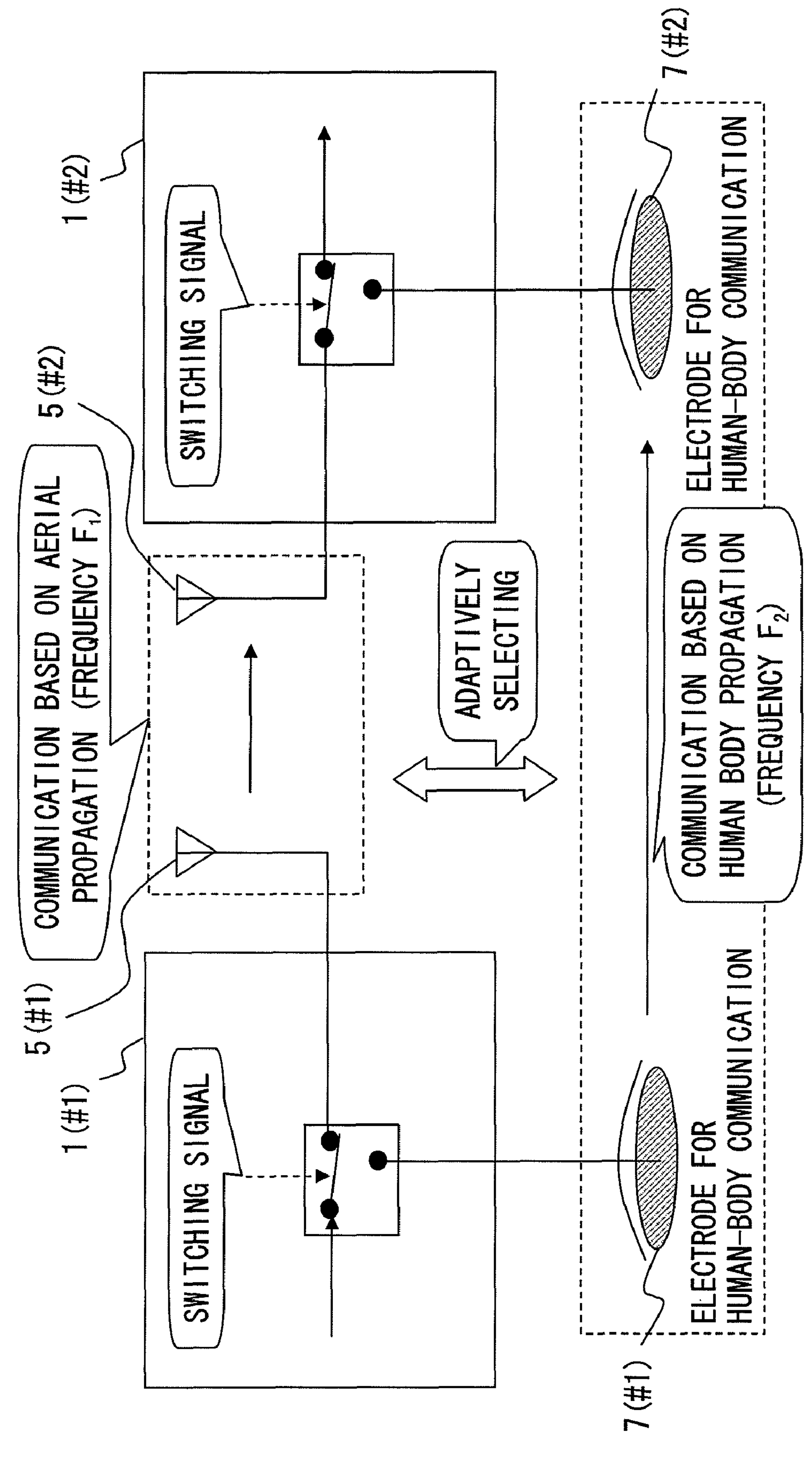
FIG. 2 is a conceptual diagram showing a communication system of the BAN system.

FIG. 2 is a conceptual diagram showing a communication system of the BAN system.

As illustrated in FIG. 2, the sensor device 1 in the present embodiment includes an antenna for aerial communication (which will hereinafter be simply termed an antenna) 5 and an electrode for human-body communication (which will hereinafter be simply referred to as an electrode) 7. The sensor device 1 transmits and receives electromagnetic waves having a frequency $F_1$ via the antenna 5, which are propagated through in the air. The sensor device 1 transmits and receives the electromagnetic waves of a frequency $F_2$ by dint of an electric field generated on the surface of the human body with an electrode 7.

The frequency $F_1$ utilized for the aerial communication is, as described above, allocated in a range of hundreds of megahertz (MHz) through several gigahertz (GHz). On the other hand, the frequency $F_2$ utilized for the human-body communication is allocated in a range of 10 MHz or under, which is by far lower than the frequency $F_1$, due to a propagation channel characteristic thereof.

The sensor device 1 in the present embodiment adaptively selects and executes any one type of communications, i.e., the aerial communication or the human-body communication that utilize the frequencies largely different from each other. Namely, the sensor device 1, if a communication state gets deteriorated in one type of communication system, switches over to the other type of communication system.

The frequency $F_1$ utilized for the aerial communication and the frequency $F_2$ utilized for the human-body communication are, as described above, largely different from each other in terms of a difference between their propagation channel characteristics. Accordingly, fading environments caused at the frequency $F_1$ and the frequency $F_2$ have a low correlation. As a result, in a time zone during which the fading affects the aerial communication using the frequency $F_1$, there is a high possibility of not being affected by the fading owing to the switchover to the human-body communication using the frequency $F_2$.

Figure 11:
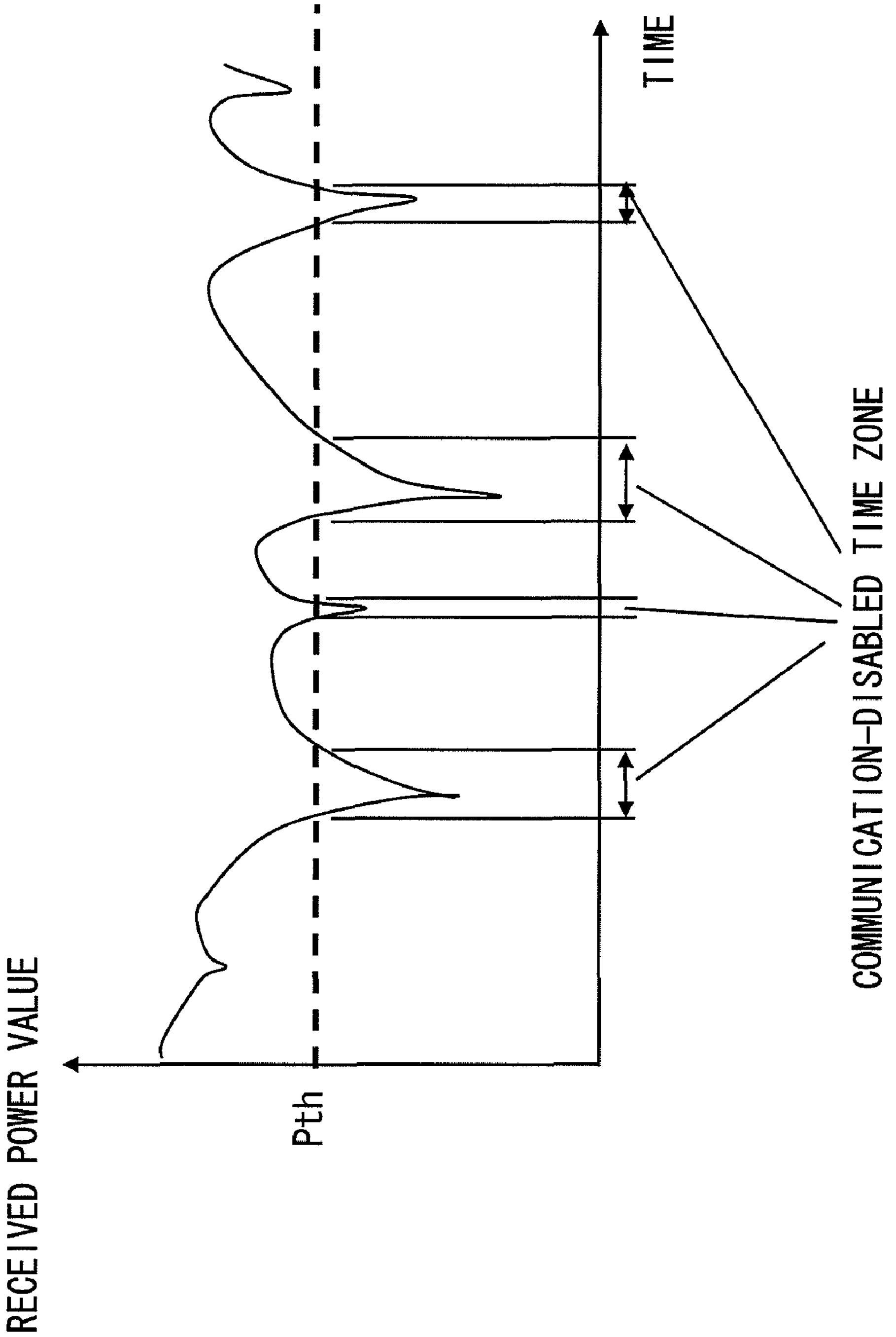
FIG. 11 is a diagram showing an example of fading which occurs in a conventional BAN system.

Accordingly, for example, the communications-disabled time zone can be avoided by the switchover to the other communication system in a communications-disabled time zone as shown in FIG. 11. The sensor device 1 in the present embodiment can avoid a communication fault caused by the fading etc that acts on the specified frequency $F_1$ or $F_2$, and can realize the wireless communications with continuously high reliability. By extension, the sensor device 1 in the present embodiment can be applied to a medical system etc which entails monitoring with the continuously high reliability.

First Embodiment

The sensor device in a first embodiment will be described.

[Configuration of Device]

Figure 3:
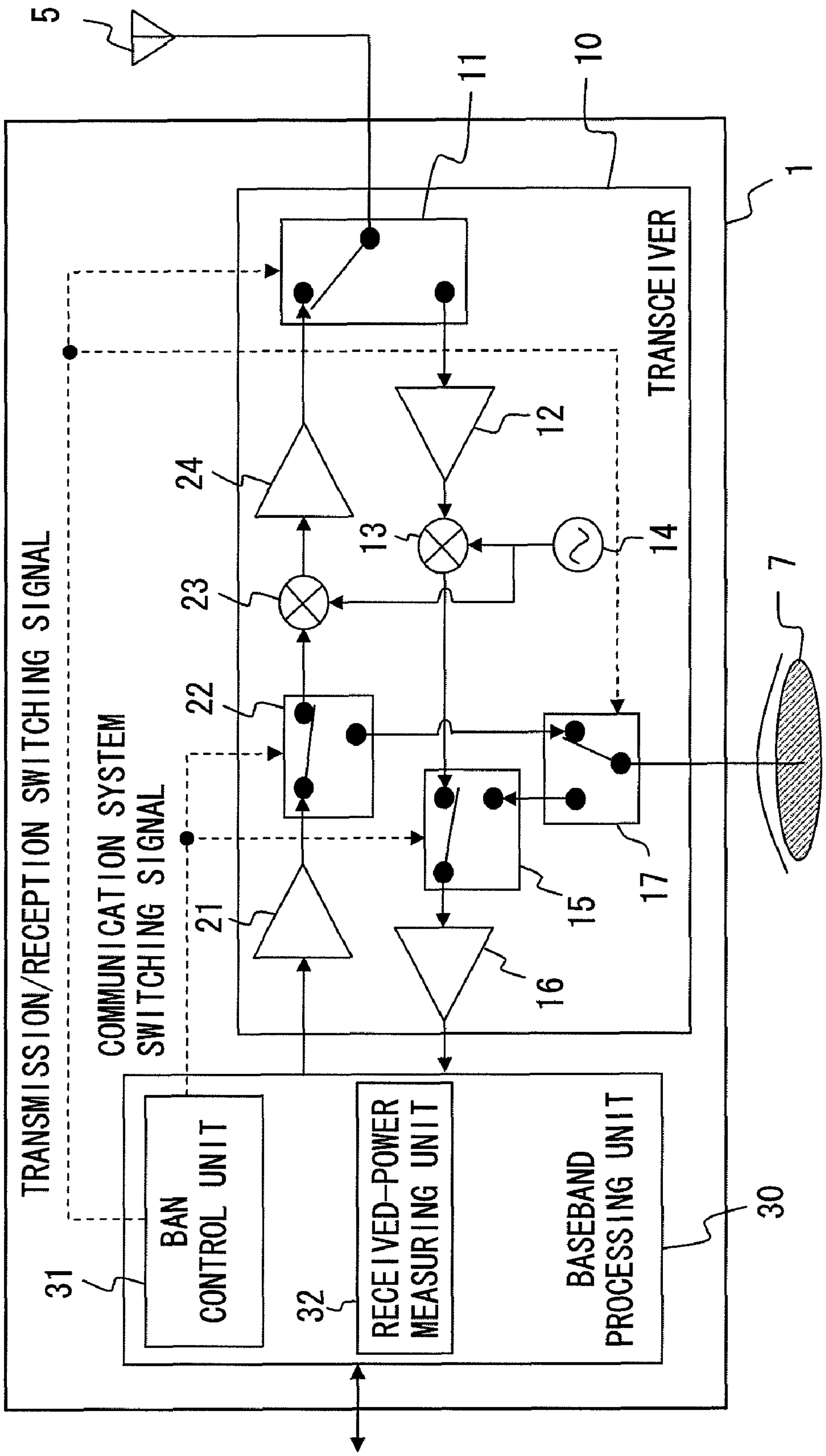
FIG. 3 is a block diagram showing an outline of a partial configuration of a sensor device in a first embodiment.

FIG. 3 is a block diagram showing an outline of a partial configuration of the sensor device 1 in the first embodiment.

The sensor device 1 in the first embodiment includes the antenna 5, the electrode 7, a transceiver 10 and a baseband processing unit 30 as part of its components. The first embodiment specializes mainly a communication function, and hence other functions such as a sensing function are neither illustrated nor explained. The transceiver 10 and the baseband processing unit 30 are realized by software components or hardware components or combinations thereof (refer to the paragraph [Others]).

The transceiver 10 includes a wireless processing unit (which is all the unit excluding the electrode 7 and a transmitting/receiving switch 17) for processing radio signals propagating through the space, and a wireless processing unit (human-body communication amplifiers 16, 21, communication system switches 15, 22, the transmitting/receiving switch 17, the electrode 7) for processing the radio signals propagated along the surface of the human body or in the human body. The transceiver 10 processes baseband signals transmitted from the baseband processing unit 30 with the wireless processing unit corresponding to the theretofore-selected communication system, and transmits the processed radio signals via the antenna 5 or the electrode 7 corresponding to the communication system. When receiving the radio signals via the antenna 5 or the electrode 7, the transceiver 10 converts the radio signals into the baseband signals similarly with the wireless processing unit corresponding to the theretofore-selected communication system, and transmits the baseband signals to the baseband processing unit 30.

To be specific, the transceiver 10 includes the transmitting/receiving switches 11, 17, aerial communication amplifiers 12, 24, human-body communication amplifiers 16, 21, an up-converter 23, a down-converter 13, a local oscillator 14, communication system switches 15, 22, etc.

The transmitting/receiving switch 11 switches a communication line linked to the antenna 5 so as to establish a connection to a transmission circuit or a reception circuit, corresponding to a transmission/reception switching signal transmitted from the baseband processing unit 30. Specifically, the transmitting/receiving switch 11, when the transmission/reception switching signal indicates the switchover to the transmission side, connects an antenna terminal connecting with the antenna 5 to an input terminal connecting with the aerial communication amplifier 24. The transmitting/receiving switch 11, when the transmission/reception switching signal indicates the switchover to the reception side, connects the antenna terminal to an output terminal connecting with the aerial communication amplifier 12.

The transmitting/receiving switch 17 switches a communication line linked to the electrode 7 so as to establish the connection to the transmission circuit or the reception circuit, corresponding to the transmission/reception switching signal transmitted from the baseband processing unit 30. To be specific, the transmitting/receiving switch 17, when the transmission/reception switching signal indicates the switchover to the transmission side, connects a terminal connecting with the electrode 7 to an input terminal connecting with the communication system switch 22. The transmitting/receiving switch 17, when the transmission/reception switching signal indicates the switchover to the reception side, connects the terminal connecting the electrode 7 to an output terminal connecting with the communication system switch 15.

The communication system switches 15 and 22 perform switching so as to process the signals transmitted and received via the antenna 5 or the signals transmitted and received via the electrode 7, corresponding to the communication system switching signal transmitted from the baseband processing unit 30. The communication system switch 22 switches over an output destination of the transmission signal, while the communication system switch 15 switches over an input of the received signal.

Specifically, the communication system switch 22, when the communication system switching signal indicates the aerial communication, connects an input terminal connecting with the human-body communication amplifier 21 to an output terminal connecting with the up-converter 23. The communication system switch 22, when the communication system switching signal indicates the human-body communication, connects the input terminal connecting with the human-body communication amplifier 21 to an output terminal connecting with the transmitting/receiving switch 17.

The communication system switch 15, when the communication system switching signal indicates the aerial communication, connects an input terminal connecting with the down-converter 13 to an output terminal connecting with the human-body communication amplifier 16. The communication system switch 15, when the communication system switching signal indicates the human-body communication, connects the input terminal connecting with the transmitting/receiving switch 17 to the output terminal connecting with the human-body communication amplifier 16.

The human-body communication amplifier 21 amplifies the baseband signals transmitted from the baseband processing unit 30, and thus generates the signals having electric power needed for the human-body communication. As for the electric power needed for the human-body communication, for example, it may be sufficient to ensure the electric power of such a level that the signals transmitted from the electrode 7 can be received by the electrode of the sensor device of a communication partner and demodulated by an A/D converter of the baseband processing unit of this sensor device. The human-body communication amplifier 21 transmits the generated signal to the communication system switch 22.

The up-converter 23, when receiving the signal amplified by the human-body communication amplifier 21 via the communication system switch 22, mixes the signal with output signal from the local oscillator 14, thereby converting the signal into high-frequency signal. The high-frequency signal has the frequency $F_1$ exemplified in FIG. 2. The up-converter 23 transmits the thus-converted high-frequency signal to the aerial communication amplifier 24.

The local oscillator 14 oscillates a predetermined frequency used for the up-converter 23 and the down-converter 13 to process the predetermined high-frequency signals. In the example of FIG. 2, the local oscillator 14 oscillates the frequency $F_1$.

The aerial communication amplifier 24 amplifies the signals converted by the up-converter 23. The signals transmitted from the up-converter 23 have already been amplified by the human-body communication amplifier 21. The aerial communication amplifier 24 further amplifies the signals to the electric power needed for the aerial communication. As for the electric power needed for the aerial communication, for instance, it may be sufficient to ensure the electric power of such a level that the signals transmitted from the antenna 5 can be received by the antenna of the sensor device of the communication partner and demodulated by the A/D converter of the baseband processing unit of this sensor device. Namely, it may be sufficient that the signals output from the electrode 7 when performing the human-body communication and the signals output from the antenna 5 when performing the aerial communication are, though different in their propagation channels and internal circuits of the transceivers 10 for processing the signals, eventually processed so as to hold the electric power equal to or larger than a threshold value in the baseband processing unit 30 of the sensor device on the receiving side. The aerial communication amplifier 24 transmits the amplified signals to the transmitting/receiving switch 11.

The aerial communication amplifier 12 amplifies weak signals received from the antenna 5 via the transmitting/receiving switch 11 in a way that reduces noises. The aerial communication amplifier 12 transmits the amplified signals to the down-converter 13.

The down-converter 13 mixes the signals transmitted from the aerial communication amplifier 12 with the output signals given from the local oscillator 14, thereby converting these signals into the baseband signals. The down-converter 13 transmits the converted baseband signals to the communication system switch 15.

The human-body communication amplifier 16, when the communication system switch 15 is switched over to the human-body communication side, amplifies the weak signals received from the electrode 7 via the transmitting/receiving switch 17 in a way that reduces the noises. By contrast, the human-body communication amplifier 16, when communication system switch 15 is switched over to the aerial communication side, amplifies the signals which are frequency-converted by the down-converter 13 as the necessity arises. The human-body communication amplifier 16 transmits the amplified signals to the baseband processing unit 30.

The baseband processing unit 30 executes the baseband process. The baseband processing unit 30 receives predetermined items of transmission information from another unillustrated function unit. The baseband processing unit 30 converts the transmission information into the baseband signal by encoding, modulating, etc and transmits the converted baseband signal to the transceiver 10. The predetermined items of transmission information are, e.g., biological information (a blood pressure, a body temperature, etc) collected from the sensor devices 1 attached to the human body 9.

On the other hand, when receiving the baseband signal corresponding to the signals received by the antenna 5 or the electrode 7, the baseband processing unit 30 demodulates and decodes the baseband signal, thereby obtaining reception information from the baseband signal. The reception information represents the information showing acknowledgement of the reception if, e.g., the received signal is an ACK (the acknowledgement of the reception) signal. For others, the reception information may also be the biological information described above. The obtained reception information is transmitted to another function unit unillustrated. The sensor device 1 in the first embodiment, when receiving data signal other than a control signal such as the ACK signal, transmits back the ACK signal.

The baseband processing unit 30 includes a BAN control unit 31 and a received-power measuring unit 32.

The received-power measuring unit 32 measures the received power of the baseband signals corresponding to the received signal transmitted from the transceiver 10. The received-power measuring unit 32 may measure the received power by targeting on all of the received signals transmitted to the baseband processing unit 30, and may also measure the received power by targeting on the received signals other than the ACK signal. The received-power measuring unit 32 transmits information on the measured received power to the BAN control unit 31.

The BAN control unit 31 controls the switchover of the communication system. The BAN control unit 31 selects any one type of communications, i.e., the aerial communication or the human-body communication, and transmits the communication system switching signal indicating the selected result to the communication system switches 15 and 22 of the transceiver 10 described above. The BAN control unit 31 makes the selection based on the received power value measured by the received-power measuring unit 32 if the sensor device 1 is set on the receiving side and makes the selection based on the ACK signal if the sensor device 1 is set on the transmitting side.

Specifically, the BAN control unit 31, if the received power value is smaller than predetermined threshold power value retained in an adjustable manner beforehand, switches over the communication system selected at the present to the other communication system. Further, the BAN control unit 31, if the ACK signal is not received in an ACK waiting status, switches over the communication system selected at the present to the other communication system.

With this scheme, the BAN control unit 31 realizes frequency diversity between the frequency $F_1$ utilized for the aerial communication and the frequency $F_2$ utilized for the human-body communication. Note that an in-depth description of the switchover control of the communication system by the BAN control unit 31 will be given in the paragraph [Operational Example].

The BAN control unit 31 further uses the antenna 5 and the electrode 7 in common to the transmission and the reception, and therefore controls the switchover between the transmission and the reception. The BAN control unit 31 transmits the transmission/reception switching signal as a control result to the transmitting/receiving switches 11 and 17 of the transceiver 10. Transmission/reception switching timing may be implemented by use of a time slot to be allocated and may be set on the receiving side in a normal status but switched over to the transmitting side only if the transmission information exists.

Operational Example

Figure 4:
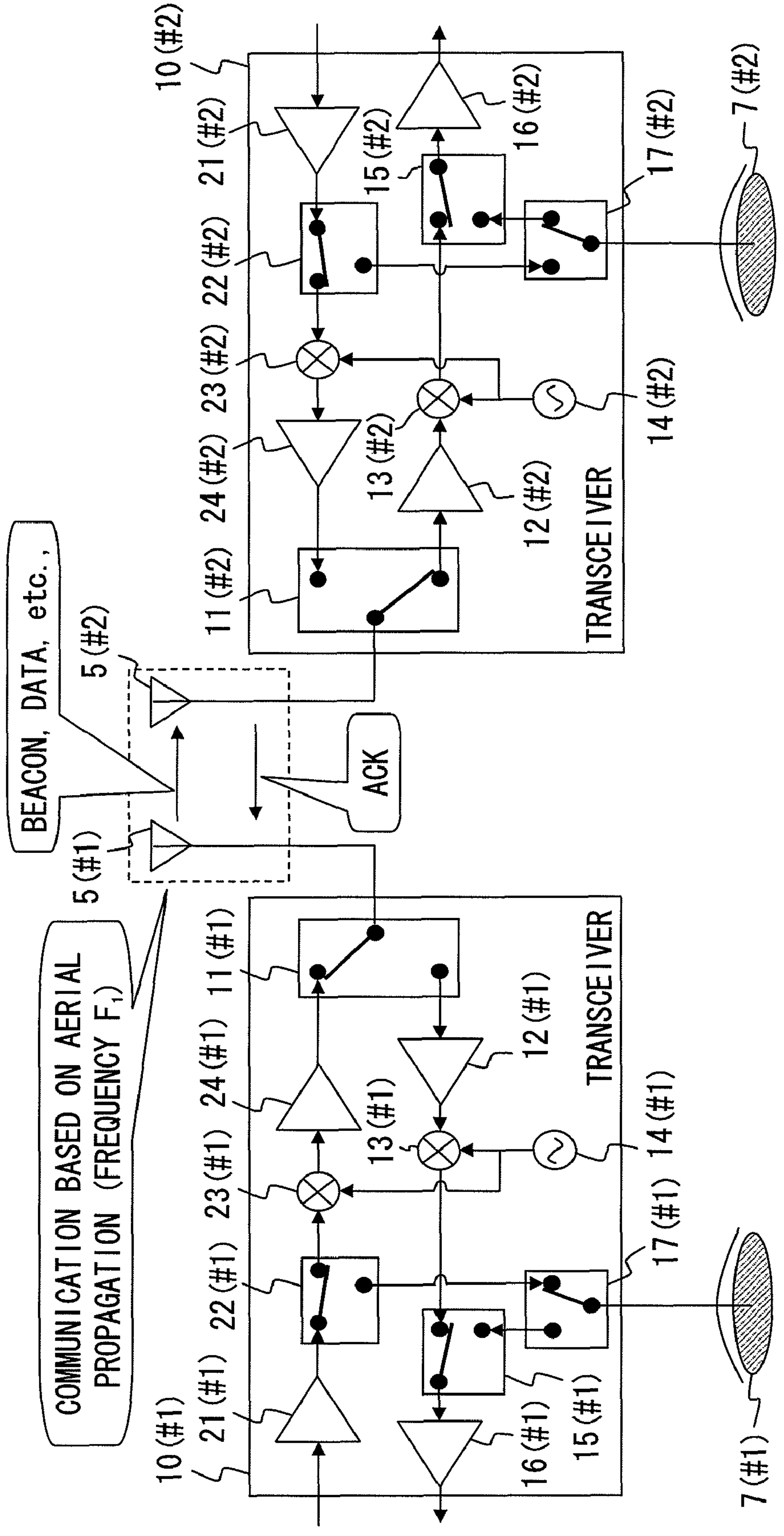
FIG. 4 is a diagram showing an example of aerial communication of the sensor device in the first embodiment.
Figure 5:
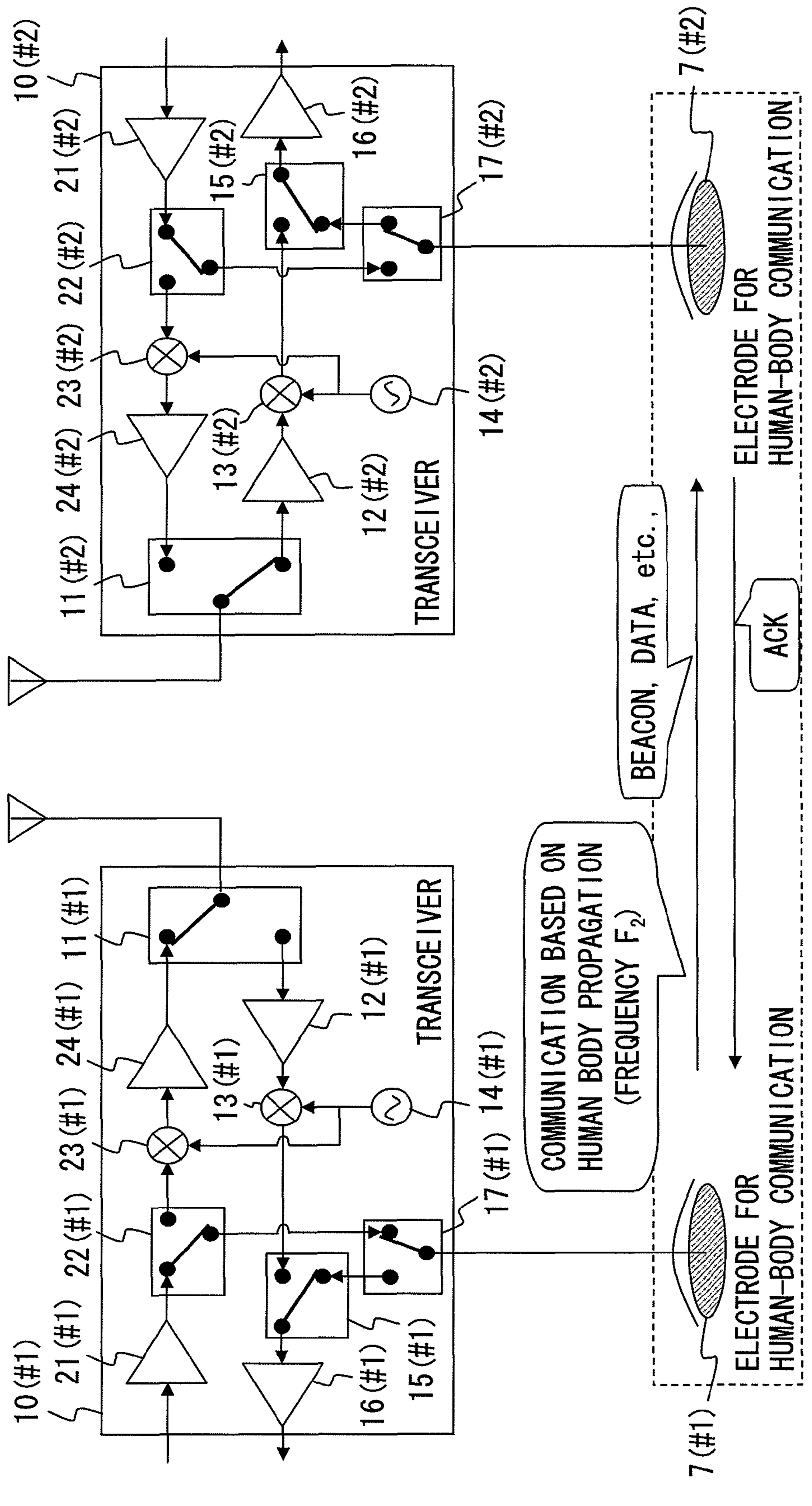
FIG. 5 is a diagram showing an example of human-body communication of the sensor device in the first embodiment.

An operational example of the sensor device 1 in the first embodiment will hereinafter be described with reference to FIGS. 4 and 5. FIG. 4 is a diagram showing an example of the aerial communication of the sensor device 1 in the first embodiment. FIG. 5 is a diagram showing an example of the human-body communication of the sensor device 1 in the first embodiment. FIGS. 4 and 5 illustrate the operational examples in a case where the predetermined information is transmitted to the sensor device 1 (#2) from the sensor device 1 (#1) in the first embodiment.

In the transmission/reception relation in the examples in FIGS. 4 and 5, the sensor devices 1 (#1) and 1(#2) in the first embodiment operate as follows.

In the sensor device 1(#1), when the predetermined transmission information is transmitted to the baseband processing unit 30, the transmission/reception switching signal representing a switchover instruction to the transmitting side is sent to the transceiver 10(#1) from the BAN control unit 31. The transmitting/receiving switches 11(#1) and 17(#1) in the transceiver 10 receive the transmission/reception switching signal. Along with this operation, the transmitting/receiving switch 11(#1) connects the antennal terminal connecting with the antenna 5(#1) to the input terminal connecting with the aerial communication amplifier 24(#1). The transmitting/receiving switch 17(#1) connects the terminal connecting with the electrode 7(#1) to the input terminal connecting with the communication system switch 22(#1). At this time, the transmission/reception switching signal may not be transmitted to the transmitting/receiving switch 17(#1). As will be described later on, this is because the communication system switch 22(#1) is switched over to the aerial communication side, with the result that the transmission signal is not transmitted to the transmitting/receiving switch 17(#1).

At this time, in the sensor device 1(#2), the transmission/reception switching signal showing the switchover instruction to the receiving side is transmitted to the transceiver 10(#2) from the BAN control unit 31. As a result, conversely to the sensor device 1(#1) described above, the transmitting/receiving switches 11(#2) and 17(#2) in the transceiver 10(#2) are, as shown in FIG. 4, switched over to the receiving side. In the sensor device 1(#2) also, at this time, the transmission/reception switching signal may not be transmitted to the transmitting/receiving switch 17(#2).

Referring to FIG. 4, an operational example of the sensor device 1 in the first embodiment when performing the aerial communication will hereinafter be explained.

In the example in FIG. 4, the BAN control unit 31 of the sensor device 1(#1) selects the aerial communication, hence the communication system switching signal indicating the switchover instruction to the aerial communication is transmitted to the transceiver 10(#1) from the BAN control unit 31. The communication system switches 22(#1) and 15(#1) of the transceiver 10(#1) receive the communication system switching signal. Along with this operation, the communication system switch 22(#1) connects the input terminal connecting with the human-body communication amplifier 21(#1) to the output terminal connecting with the up-converter 23(#1). The communication system switch 15(#1) connects the input terminal connecting with the down-converter 13(#1) to the output terminal connecting with the human-body communication amplifier 16(#1).

Thereafter, the baseband signal, into which the predetermined transmission information is converted, is transmitted to the transceiver 10(#1). The baseband signal is, after being amplified by the human-body communication amplifier 21(#1), transmitted to the up-converter 23(#1) via the communication system switch 22(#1). The amplified signal is, after being frequency-converted into the frequency $F_1$ utilized for the aerial communication by the up-converter 23(#1), transmitted to the aerial communication amplifier 24(#1). The aerial communication amplifier 24(#1) amplifies this signal. The thus-generated frequency signal is transmitted from the antenna 5(#1) via the transmitting/receiving switch 11(#1).

At this time, in the sensor device 1(#2) on the receiving side also, the aerial communication are selected, and the communication system switching signal showing the switchover instruction to the aerial communication is transmitted to the transceiver 10(#2) from the BAN control unit 31. As a result, similarly to the sensor device 1(#1), the communication system switches 22(#2) and 15(#2) in the transceiver 10(#2) are switched over to the aerial communication side as shown in FIG. 4. A mechanism for taking synchronism of the communication system between the sensor device 1(#1) on the transmitting side and the sensor device 1(#2) on the receiving side, will be described later on.

The signal sent from the antenna 5(#1) is received by the antenna 5(#2) of the sensor device 1(#2). The received signal is transmitted to the aerial communication amplifier 12(#2) via the transmitting/receiving switch 11(#2) and amplified by the aerial communication amplifier 12(#2). The amplified signal is converted into the baseband signal by the down-converter 13(#2). The baseband signal is transmitted to the human-body communication amplifier 16(#2) via the communication system switch 15(#2) and, after being amplified by the human-body communication amplifier 16(#2), transmitted to the baseband processing unit 30.

When the predetermined information can be extracted from the baseband signal in the baseband processing unit 30, the sensor device 1(#2) transmits the ACK signal. At this time, the BAN control unit 31 of the sensor device 1(#2) transmits the transmission/reception switching signal indicating the switchover instruction to the transmitting side to the transmitting/receiving switches 11(#2) and 17(#2), and switches over the transceiver 10(#2) to a transmission-enabled status of the ACK signal. The ACK signal is sent back by the same communication system (the aerial communication) as in the case of the corresponding received signal.

An operational example of the sensor device 1 in the first embodiment when performing the human-body communication will hereinafter be described with reference to FIG. 5.

In the example of FIG. 5, the BAN control unit 31 of the sensor device 1(#1) selects the human-body communication, whereby the communication system switching signal indicating the switchover instruction to the human-body communication is transmitted to the transceiver 10(#1) from the BAN control unit 31. When receiving this communication system switching signal, the communication system switch 22(#1) connects the input terminal connecting with the human-body communication amplifier 21(#1) to the output terminal connecting with the transmitting/receiving switch 17(#1). The communication system switch 15(#1) connects the input terminal connecting with the transmitting/receiving switch 17(#1) to the output terminal connecting with the human-body communication amplifier 16(#1).

Thereafter, the baseband signal, into which the predetermined transmission information is converted, is transmitted to the transceiver 10(#1). The baseband signal is, after being amplified by the human-body communication amplifier 21(#1), transmitted to the electrode 7(#1) via the communication system switch 22(#1) and the transmitting/receiving switch 17(#1). The amplified signal has the frequency $F_2$ utilized for the human-body communication.

The radio signal of this frequency $F_2$ is propagated along the electric field generated on the surface of the human body 9 by the electrode 7(#1) and received by the electrode 7(#2).

At this time, in the sensor device 1(#2) on the receiving side also, the human-body communication are selected, and the communication system switching signal showing the switchover instruction to the human-body communication is transmitted to the transceiver 10(#2) from the BAN control unit 31. As a result, similarly to the sensor device 1(#1), the communication system switches 22(#2) and 15(#2) in the transceiver 10(#2) are switched over to the human-body communication side as shown in FIG. 5.

The signal received by the electrode 7(#2) is transmitted to the human-body communication amplifier 16(#2) via the transmitting/receiving switch 17(#2) and the communication system switch 15(#2). The signal is, after being amplified by the human-body communication amplifier 16(#2), transmitted to the baseband processing unit 30.

When the predetermined information can be extracted from the baseband signal in the baseband processing unit 30, the sensor device 1(#2) transmits the ACK signal by the same technique as explained in FIG. 4. The ACK signal is sent back by the same communication system (the human-body communication) as in the case of the corresponding received signal.

<Processing Flow>

Figure 6:
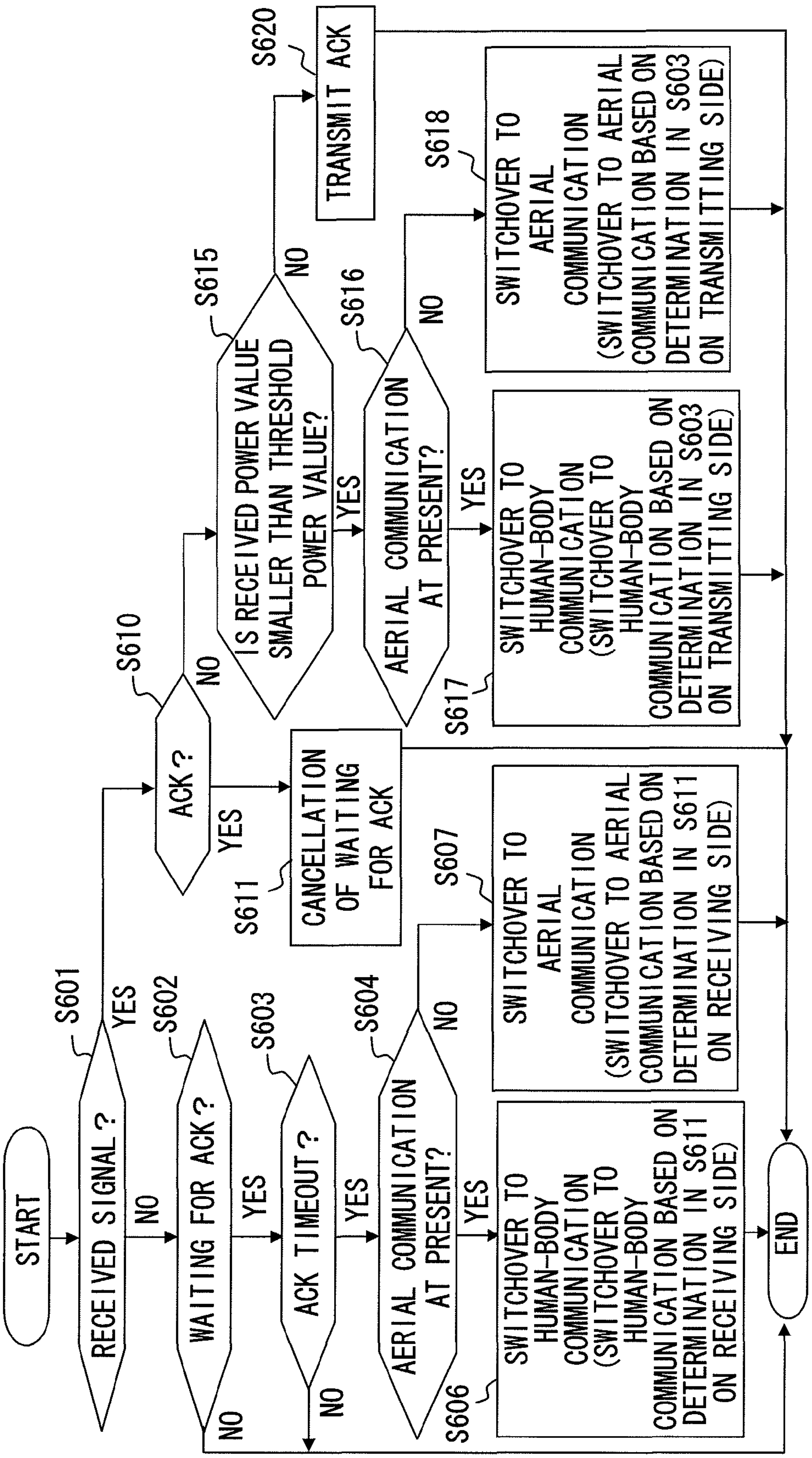
FIG. 6 is a flowchart showing a processing example of the sensor device in the first embodiment.

A processing example of the sensor device 1 in the first embodiment will hereinafter be explained referring to FIG. 6. FIG. 6 is a flowchart showing the processing example of the sensor device 1 in the first embodiment. The process shown in FIG. 6 is a process of the BAN control unit 31 mainly in a status where the transceiver 10 is switched over to the receiving side. The BAN control unit 31 sequentially executes the following processes (steps) at a predetermined cycle or when receiving the signal.

The BAN control unit 31 detects whether or not there is the baseband signal into which the signal received by the antenna 5 or the electrode 7 is converted (S601). The BAN control unit 31, if there is no received signal (S601; NO), determines whether it is an ACK waiting status or not (S602). The BAN control unit 31 comes to the ACK waiting status after wirelessly transmitting the predetermined information.

The BAN control unit 31, if determined to be the ACK waiting status (S602; YES), determines whether an ACK timeout period elapses or not (S603). The ACK timeout period is retained in the adjustable manner beforehand. The BAN control unit 31, when determining that the ACK timeout period elapses (S603; YES), checks the communication system selected at the present (S604).

The BAN control unit 31, if the communication system selected at the present indicates the aerial communication (S604; YES), determines the switchover to the human-body communication system (S606). The BAN control unit 31, if the communication system selected at the present does not indicate the aerial communication (S604; NO), determines the switchover to the aerial communication (S607). The BAN control unit 31 transmits the communication system switching signal showing a result of this determination to the transceiver 10.

The BAN control unit 31, if not in the ACK waiting status (S602; NO) and if the ACK timeout period does not elapse in the ACK waiting status (S603; NO), there is no received signal, and hence the process is directly terminated.

By contrast, if the received signal exists (S601; YES) and if this received signal is the ACK signal (S610; YES), the BAN control unit 31 cancels the ACK waiting status (S611).

The communication system switchover process described above is the process in such a case that the sensor device 1 is in the ACK waiting status, i.e., the sensor device 1 is set on the transmitting side of the predetermined information. At this time, the same communication system should be selected in the sensor device 1 on the transmitting side of the ACK signal, i.e., on the receiving side of the predetermined information (which will hereinafter be referred to as the sensor device 1 on the receiving side).

The sensor device 1 on the receiving side, when receiving the radio signals containing the predetermined information from the sensor device 1 on the transmitting side of the predetermined information, executes the following process. The BAN control unit 31 determines that the received signal exists (S601; YES) and this received signal is not the ACK signal (S610; NO).

At this time, the received signal is transmitted to the baseband processing unit 30. The received-power measuring unit 32 measures the power of the received signal (S615).

The BAN control unit 31 receives the information on the received power from the received-power measuring unit 32, and determines whether or not the received power value is smaller than the threshold power value (S615). The BAN control unit 31, when determining that the received power value is smaller than the threshold power value (S615; YES), checks the communication system selected at the present (S616).

The BAN control unit 31, if the communication system selected at the present indicates the aerial communication (S616; YES), determines the switchover to the human-body communication (S617). The BAN control unit 31, if the communication system selected at the present does not indicate the aerial communication (i.e., the human-body communication) (S616; NO), determines the switchover to the aerial communication (S618). The BAN control unit 31 transmits the communication system switching signal showing a result of this determination to the transceiver 10.

The BAN control unit 31, when determining the received power value is equal to or larger than the threshold power value (S615; NO), transmits the ACK signal representing the normal reception (S620).

Thus, the sensor device 1 on the receiving side, if the received power value of the radio signals containing the predetermined information is smaller than the threshold power value, i.e., if the a propagation environment for the radio signals is not acceptable, switches over the communication system selected at the present to the other system. In this case, the sensor device 1 on the receiving side does not transmit back the ACK signal. This operation disables the sensor device 1 transmitting the predetermined information from receiving the ACK signal, and the communication system is switched over to the other system based on the determination in S603. As a result, the same communication system is selected by the sensor devices 1 both on the transmitting side and on the receiving side.

Operation and Effect in First Embodiment

The sensor device 1 in the first embodiment discussed above has the transceiver 10 including the wireless processing unit for implementing both of the aerial communication and the human-body communication, which utilize the frequency bands having the low correlation in the respective fading environments. In this configuration, any one type of communication systems, i.e., the aerial communication or the human-body communication, is selected adaptively corresponding to the reception state thereof. Namely, if the communication state gets deteriorated due to the influence of the fading etc during the execution of the aerial communication, the communication system is switched over to the human-body communication utilizing the frequency band that is largely different therefrom. Conversely, if the communication state gets deteriorated during the execution of the human-body communication, the communication system is switched over to the aerial communication utilizing the frequency band that is largely different therefrom.

With this effect, according to the sensor device 1 in the first embodiment, it is feasible to acquire the large frequency diversity effect and to realize the wireless communications exhibiting the continuously high reliability.

In the sensor device 1 in the first embodiment, when set on the transmitting side of the predetermined information, the communication system is switched over to the other due to the not-yet-received status of the ACK signal. Conversely when set on the receiving side of the predetermined information and if the received power value of the radio signals containing the predetermined information is smaller than the threshold power value, the communication system is switched over to the other.

With this scheme, according to the sensor device 1 in the first embodiment, the synchronism for switching over the communication system can be taken without any mutual notification of the switchover of the communication system between the sensor devices. Accordingly, the effects described above can be acquired with the simple configuration.

Second Embodiment

The sensor device in a second embodiment will be described. The sensor device in the second embodiment determines the switchover of the communication system by taking a priority mode together with the communication status into consideration. The sensor device in the second embodiment involves using, as this priority mode, a transmission rate priority mode of giving the priority to a transmission rate and a power priority mode of giving the priority to a decrease in the power consumption.

[Configuration of Device]

Figure 7:
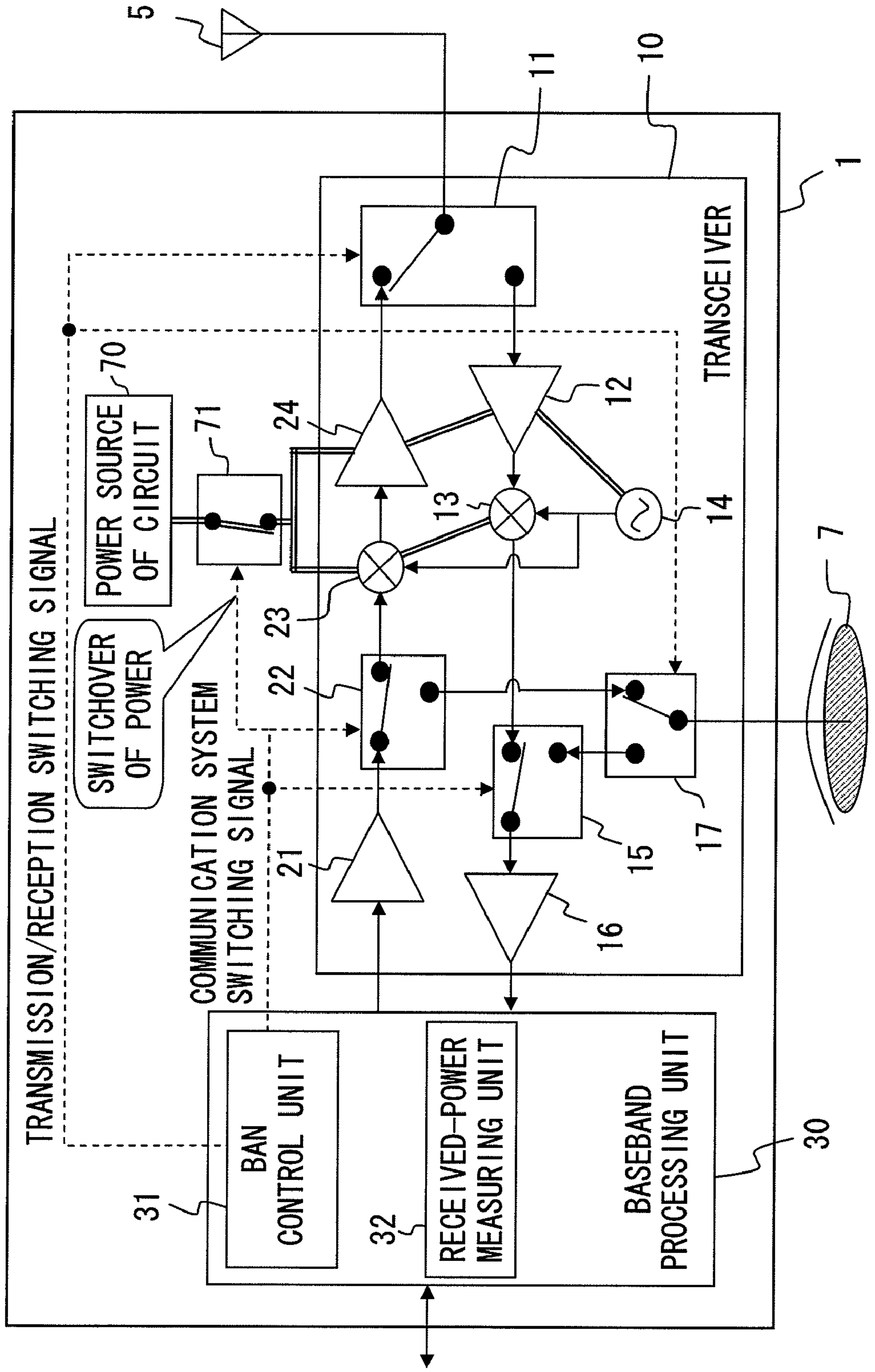
FIG. 7 is a block diagram showing an outline of a partial configuration of the sensor device in a second embodiment.

FIG. 7 is a block diagram showing an outline of a partial configuration of the sensor device in the second embodiment.

As illustrated in FIG. 7, the sensor device 1 in the second embodiment further includes a power switch 71 in addition to the components in the first embodiment. Other configurations except the BAN control unit 31 are the same as those in the first embodiment. The discussion will hereinafter be focused on different configurations from the first embodiment. Note that a circuit power source 70 illustrated in FIG. 7 is provided also in the first embodiment but omitted in its explanation in the first embodiment.

The power switch 71 switches over a connecting state between an electric power line connecting with the wireless processing units (the aerial communication amplifiers 12, 24, the up-converter 23, the down-converter 13 and the local oscillator 14) operating only when performing the aerial communication and an output line of the circuit power source 70 for supplying the electric power thereto. The power switch 71 receives the communication system switching signal from the BAN control unit 31 and, if this signal indicates the switchover to the human-body communication, switches the connecting state thereof OFF. Namely, the power switch 71, when the human-body communication system is selected, stops supplying the electric power to the aerial communication amplifiers 12, 24, the up-converter 23, the down-converter 13 and the local oscillator 14.

The BAN control unit 31 manages the priority mode. The priority mode may be adjustably retained beforehand and may also be automatically switched over corresponding to a transmission data size. In the latter case, for example, the sensor device 1 sets the transmission rate priority mode if a should-be-transmitted data size is larger than a predetermined threshold value and sets the power priority mode in other cases. In the latter case, the sensor device 1 on the receiving side of the data may receive notification of the priority mode from the sensor device 1 on the transmitting side.

The BAN control unit 31 further executes, in addition to the communication system switchover process in the first embodiment, a communication system switchover process corresponding to the priority mode. This switchover process entails the switchover to the communication system (the aerial communication or the human-body communication) set preferentially as the priority mode with respect to other time zones excluding the time zone in which the communication state is not acceptable. The switchover process is executed at predetermined timing in synchronization with other sensor devices. The predetermined timing may be a predetermined cycle taking the synchronism between the respective sensor devices and may also be timing when a dedicated signal is transmitted and received between the sensor devices.

The BAN control unit 31, when the priority mode is set to the transmission rate priority mode, performs the control so that the aerial communication system is selected. This is because the frequency $F_1$ utilized for the aerial communication is by far larger than the frequency $F_2$ utilized for the human-body communication and therefore enables the high-speed transmission to be attained.

In the case of implementing the aerial communication system, as compared with the human-body communication system, the number of the units operating within the transceiver 10 increases. During the human-body communication, the power switch 71 stops supplying the electric power to the aerial communication amplifiers 12, 24, the up-converter 23, the down-converter 13 and the local oscillator 14, and consequently the power consumption becomes smaller than when in the aerial communication. With this scheme, the BAN control unit 31 selects the human-body communication system when the priority mode is set to the power priority mode.

The BAN control unit 31, upon executing the switchover of the communication system corresponding to the priority mode, transmits a test signal based on the post-switchover communication system. The BAN control unit 31 conducts the same communication system switchover process as in the first embodiment by use of this test signal, thereby checking the communication status of the post-switchover communication system. The sensor device 1 transmitting the test signal comes to the ACK waiting status in the same way as in the first embodiment, while the sensor device 1 receiving the test signal determines the switchover of the communication system based on the received power similarly to the first embodiment.

There is, however, no necessity for all of the sensor devices 1 to transmit the test signal. Hence, setting information showing whether the test signal should be transmitted or not may also be adjustably retained beforehand by each sensor device 1, and the sensor device 1 required to perform the transmitting operation may take initiative in transmitting the test signal.

Operational Example

Figure 8:
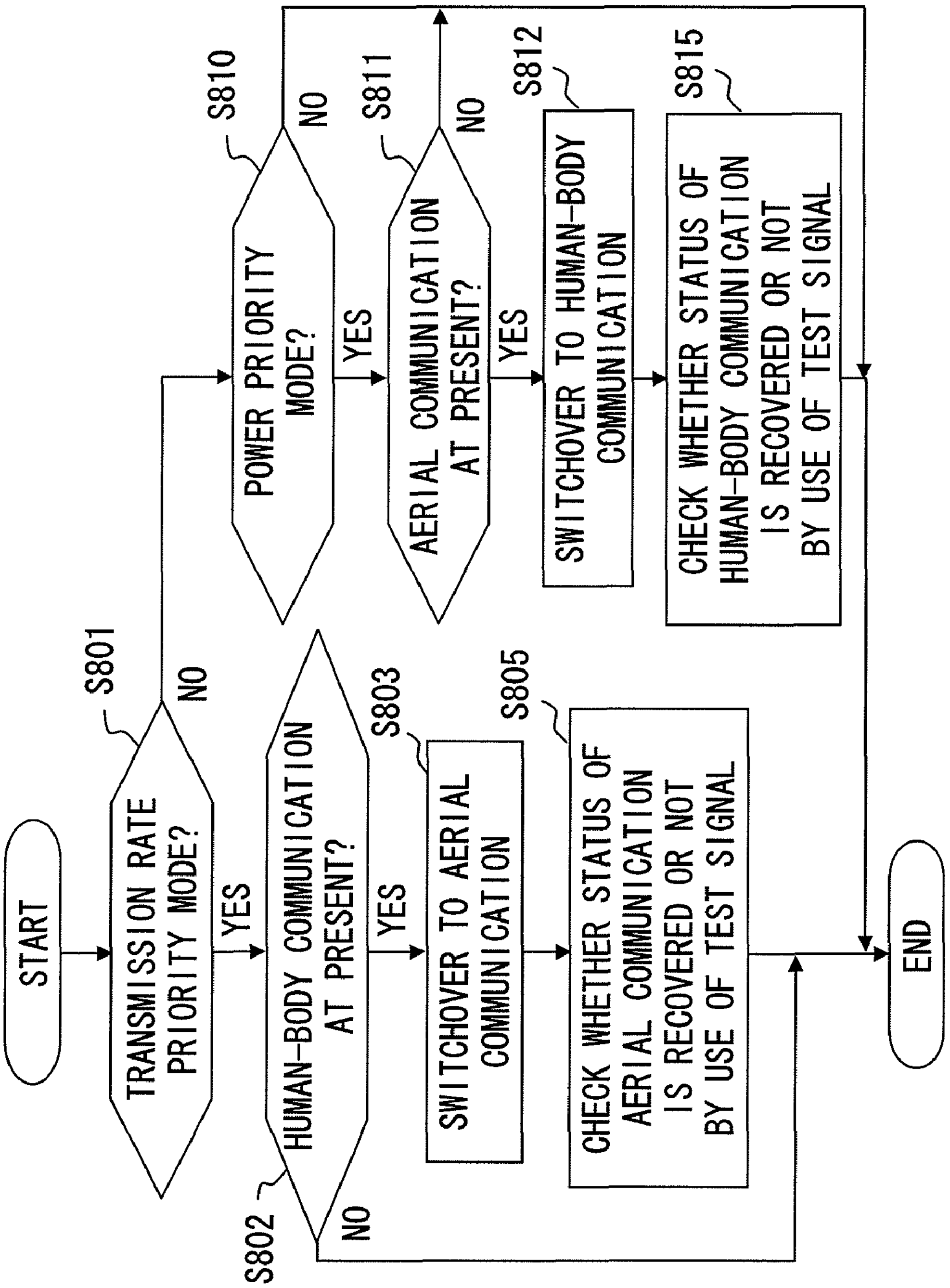
FIG. 8 is a flowchart showing a processing example of the sensor device in the second embodiment.
Figure 9:
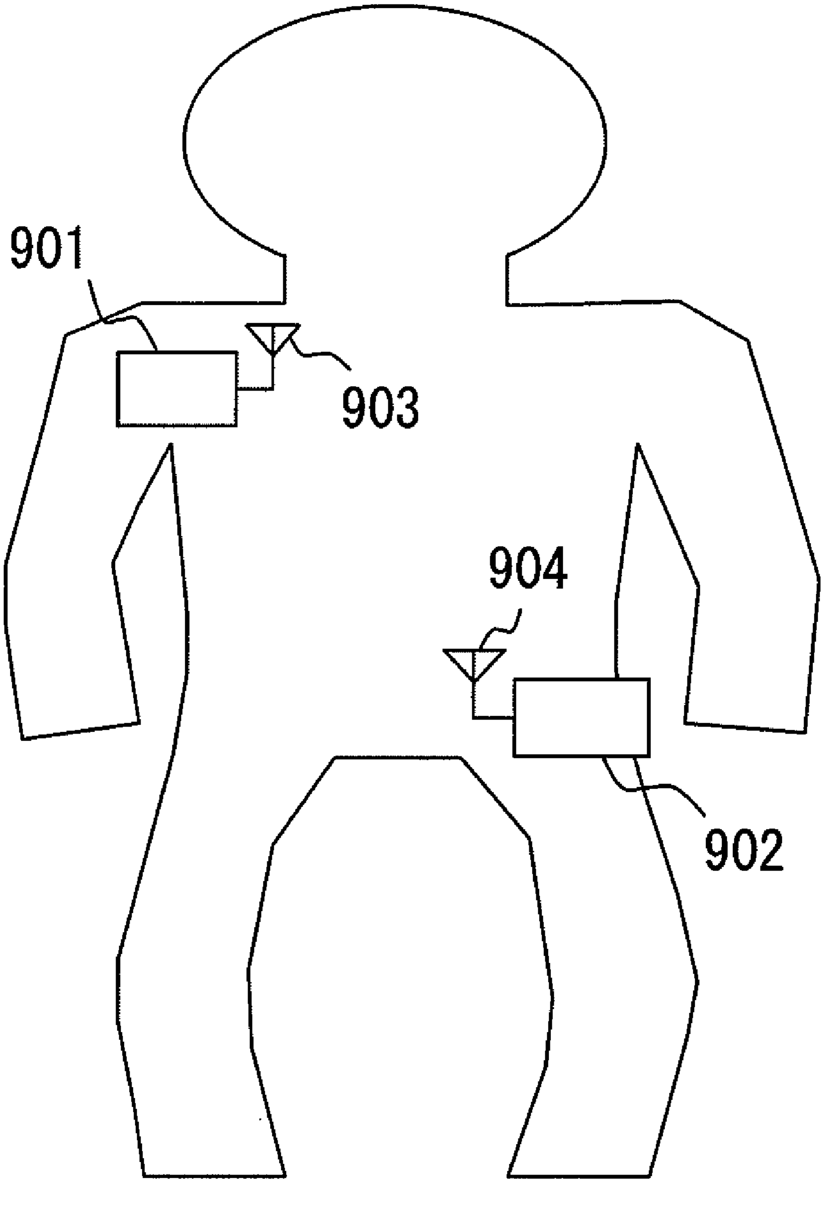
FIG. 9 is a diagram showing an outline of the BAN system using the aerial communication.
Figure 10:
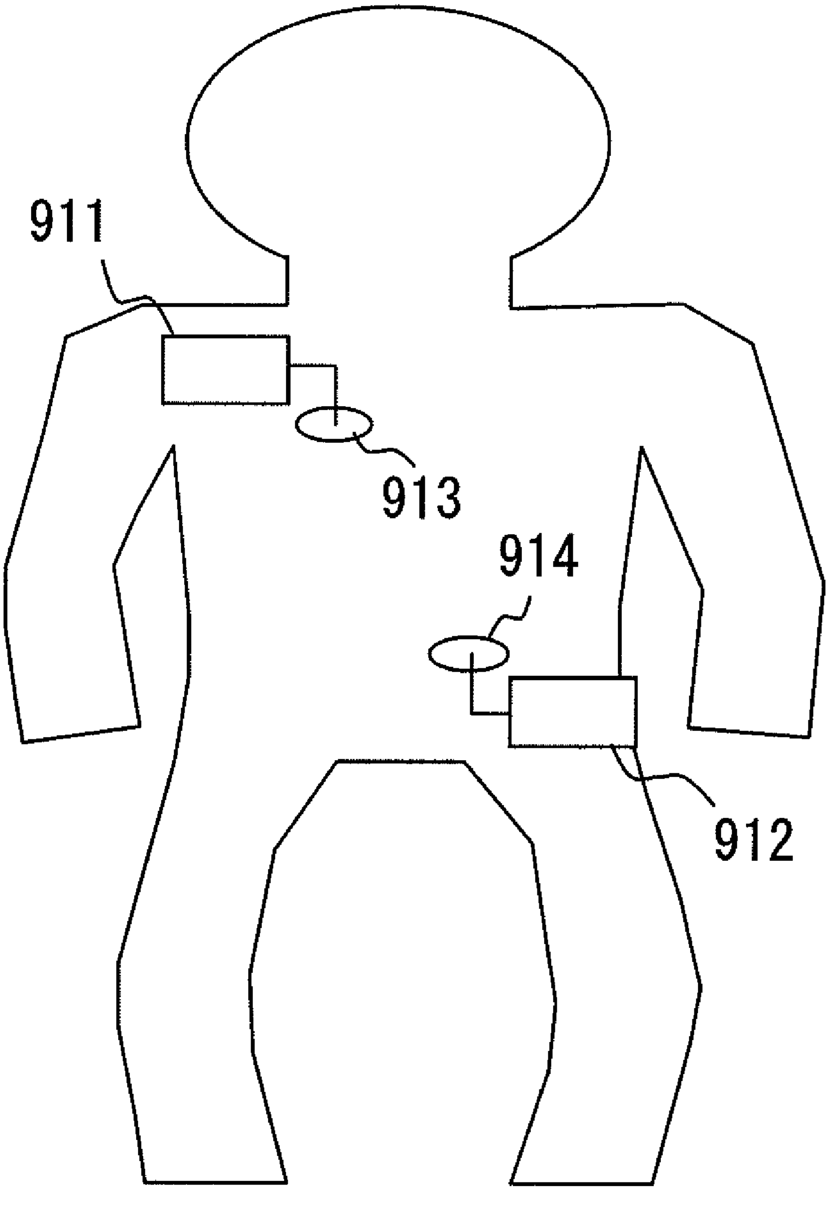
FIG. 10 is a diagram showing an outline of the BAN system using the human-body communication.

The communication system switchover process corresponding to the priority mode in the BAN control unit 31 will hereinafter be explained referring to FIG. 8 by way of an operational example of the sensor device in the second embodiment. FIG. 8 is a flowchart showing a processing example of the sensor device in the second embodiment. The BAN control unit 31 of the sensor device 1 executes the following processes at the predetermined timing in parallel with the execution of the processes in the first embodiment shown in FIG. 6.

The BAN control unit 31 checks the priority mode (S801). The BAN control unit 31, when the priority mode is set to the transmission rate priority mode (S801; YES), checks whether or not the communication system selected at the present is the human-body communication system (S802). The BAN control unit 31, if the communication system selected at the present is not the human-body communication system (S802; NO), continues the communication system as it is.

While on the other hand, the BAN control unit 31, if the communication system selected at the present is the human-body communication system (S802; YES), determines the switchover to the aerial communication system corresponding to the transmission rate priority mode (S803). The BAN control unit 31 transmits the communication system switching signal showing a result of this determination to the transceiver 10 and further transmits the baseband signal showing the test signal to the transceiver 10.

At this time, in the sensor device 1 on the receiving side of the test signal also, the processes described above are executed at the timing taking the synchronism with the sensor device 1 on the transmitting side. Hence, the sensor device 1 on the receiving side is also switched over to the same communication system as the sensor device 1 on the transmitting side is switched over to.

Hereafter, the sensor device 1 on the receiving side executes the communication system switchover process corresponding to the received power of the test signal (S615, S616, S617, S618, S620 in FIG. 6). At this time, if the communication status of the aerial communication is recovered, the ACK signal is transmitted back by the same aerial communication system from this sensor device 1. Whereas if the communication status of the aerial communication is not recovered, the sensor device 1 on the receiving side is again switched over to the human-body communication system, and the ACK signal is not transmitted back.

The sensor device 1 transmitting the test signal is in the ACK waiting status for the test signal. In this status, the sensor device 1 on the transmitting side, since the ACK signal is transmitted back from the sensor device 1 on the receiving side if the communication status of the aerial communication is recovered, continues the communication system switched over corresponding to the priority mode. Whereas if the communication status of the aerial communication is not recovered, the ACK signal is not transmitted back from the sensor device 1 on the receiving side, and hence the sensor device 1 on the transmitting side is again switched over to the human-body communication system similarly to the sensor device 1 on the receiving side.

Thus, the sensor device 1 checks by use of the test signal the recovery condition of the communication status of the aerial communication system corresponding to the transmission rate priority mode (S805).

The BAN control unit 31, when the priority mode is set to the power priority mode (S801; NO, S810; YES), checks whether or not the communication system selected at the present is the aerial communication system (S811). The BAN control unit 31, if the communication system selected at the present is not the aerial communication system (i.e., the human-body communication system) (S811; NO), continues the communication system as it is.

While on the other hand, the BAN control unit 31, if the communication system selected at the present is the aerial communication system (S811; YES), determines the switchover to the human-body communication system corresponding to the power priority mode (S812). The BAN control unit 31 transmits the communication system switching signal showing a result of this determination to the transceiver 10 and further transmits the baseband signal representing the test signal to the transceiver 10. Hereafter, in the same way as the process when set in the transmission rate priority mode, the sensor device 1 checks the recovery condition of the human-body communication system corresponding to the power priority mode by use of the test signal (S815).

Operation and Effect in Second Embodiment

A scheme in the second embodiment is that the sensor device 1 executes the switchover to the communication system corresponding to the priority mode at the predetermined timing while continuously maintaining a quality of the communications by the method according to the first embodiment.

To be specific, the sensor device 1, if the transmission rate priority mode is set in the status of selecting the human-body communication system through the switchover of the communication system corresponding to the condition of the communication, switches over the communication system to the aerial communication system at the predetermined timing, and checks the communication condition of the aerial communication. With this operation, if the communication condition of the aerial communication is recovered, the communication system is switched over to the aerial communication system enabling the high-speed transmission to be done.

Conversely, the sensor device 1, if the power priority mode is set in the status of selecting the aerial communication system through the switchover of the communication system corresponding to the condition of the communication, switches over the communication system to the human-body communication system at the predetermined timing, and checks the communication condition of the human-body communication. With this operation, if the communication condition of the human-body communication is recovered, the communication system is switched over to the human-body communication system requiring the small power consumption.

The sensor device 1 according to the second embodiment switches over the communication system to the other only in the communication-disabled time zone shown in FIG. 11, and can continue the communication system corresponding to the priority mode in other time zones.

Hence, according to the second embodiment, it is feasible to realize the wireless communications with the continuously-high reliability and further realize the high-speed transmission or the operation with the low power consumption as the necessity arises. If the sensor device 1 is attached to the human body 9 with the difficulty of an exchange, it is effective to select the power priority mode. Reversely, in the case of the sensor device 1 having the large transmission data size, it is effective to select the transmission rate priority mode.

Modified Example

The sensor device 1 in each of the embodiments discussed above determines the switchover of the communication system by use of the received power value measured by the received-power measuring unit 32, however, other information showing the reception condition may also be employed. Other information is exemplified by BLER (BLock Error Rate) measured by using the post-decoding signal, a retransmission count, etc. In this case, a reception condition determining unit is provided as a substitute for the received-power measuring unit 32, and, when judging based on other information that the reception condition is not acceptable, determines the switchover of the communication system.

Further, the received-power measuring unit 32 in each embodiment discussed above may estimate a signal to interference power ratio (SIR), a signal to interference plus noise power ratio (SINR), etc. In this case, the switchover of the communication system may be determined based on a result of comparing the SIR, SINR, etc with a threshold value (threshold power value Pth/interference power value). Note that estimation of the SIR, SINR may involve using a general technique, and hence its description is herein omitted.

Moreover, the second embodiment discussed above has exemplified the case of providing the power switch 71 in the sensor device 1, however, the power switch 71 may be omitted if the priority mode is set in only the transmission rate priority mode.

[Others]

<Concerning Hardware Components and Software Components>

Hardware components represent hardware circuits exemplified such as Field Programmable Gate Array (FPGA), Application Specific Integrated Circuit (ASIC), a gate array, a combination of logic gates, a signal processing circuit and an analog circuit.

The software components are parts (fragments) for realizing the functions as the software but do not connote a concept of limiting languages, development environments, etc for realizing the software. The software components are exemplified such as a task, a process, a thread, a driver, firmware, a database, a table, a function, a procedure, a subroutine, a predetermined segment of a program code, a data structure, an array, a variable and a parameter. These software components are actualized on one or a plurality of memories (one or a plurality of processors (e.g., a CPU (Central Processing Unit), a DSP (Digital Signal Processor), etc.)

It should be noted that the respective embodiments discussed above do not limit the method of realizing the individual function units, and therefore the function units may be configured as the hardware components or the software components or combinations thereof by techniques realizable to ordinary engineers in the present technical field.

What is claimed is:

1. A wireless communication device comprising:

a first wireless unit configured to process a first radio signal propagated through a space;

a second wireless unit configured to process a second radio signal propagated along the surface of a human body or in the human body; and a control unit configured to select, as a present radio signal, any one of the first radio signal and the second radio signal, and controlling the first wireless unit and the second wireless unit so as to process the present radio signal, wherein the control unit retains priority information for specifying any one of the first radio signal and the second radio signal as a priority radio signal, switches over the present radio signal to the priority radio signal specified by the priority information at predetermined timing, and controls the first wireless unit and the second wireless unit so as to process a test signal.

2. The wireless communication device according to claim 1, wherein the control unit, after transmitting predetermined information by use of the present radio signal, if a reception acknowledgement signal of the predetermined information is not received, switches over the present radio signal to the other radio signal.

3. The wireless communication device according to claim 1, further comprising an estimation unit configured to estimate a reception state of the present radio signal, wherein the control unit, if the reception state value acquired by the estimation unit declines under a threshold value, switches over the present radio signal to the other radio signal.

4. The wireless communication device according to claim 3, wherein the estimation unit estimates, as the reception state of the present radio signal, at least one of received power, a signal to interference power ratio and a signal to interference plus noise power ratio, and the control unit determines switchover of the present radio signal on the basis of at least one of the received power, the signal to interference power ratio and the signal to interference plus noise power ratio which are estimated by the estimation unit.

5. The wireless communication device according to claim 1, wherein the first wireless unit includes a frequency converting unit and an amplifying unit that are not included in the second wireless unit, and the control unit, when the second radio signal is selected as the present radio signal, stops supplying electric power to at least one of the frequency converting unit and the amplifying unit of the first wireless unit.

6. The wireless communication device according to claim 1, wherein the priority information specifies the first radio signal as the priority radio signal when a high transmission rate is requested, and specifies the second radio signal as the priority radio signal when low power consumption is requested.

7. A communication control method in a wireless communication device comprising a first wireless unit configured to process a first radio signal propagated through a space, and a second wireless unit configured to process a second radio signal propagated along the surface of a human body or in the human body, the method comprising:

selecting, as a present radio signal, any one of the first radio signal and the second radio signal; and controlling the first wireless unit and the second wireless unit so as to process the selected present radio signal, wherein the controlling includes retaining priority information for specifying any one of the first radio signal and the second radio signal as a priority radio signal, switching over the present radio signal to the priority radio signal specified by the priority information at predetermined timing, and controlling the first wireless unit and the second wireless unit so as to process a test signal.

8. The communication control method according to claim 7, wherein the controlling includes, after transmitting predetermined information by use of the present radio signal, if a reception acknowledgement signal of the predetermined information is not received, switching over the present radio signal to the other radio signal.

9. The communication control method according to claim 7, further comprising;

estimating a reception state of the present radio signal, wherein the controlling includes, if the reception state value acquired in the estimating declines under a threshold value, switching over the present radio signal to the other radio signal.

10. The communication control method according to claim 9, wherein the estimating includes estimating, as the reception state of the present radio signal, at least one of received power, a signal to interference power ratio and a signal to interference plus noise power ratio, and the controlling includes determining switchover of the present radio signal on the basis of at least one of the received power, the signal to interference power ratio and the signal to interference plus noise power ratio which are estimated in the estimating.

11. The communication method according to claim 7, wherein the first wireless unit includes a frequency converting unit and an amplifying unit that are not included in the second wireless unit, and the controlling includes, when the second radio signal is selected as the present radio signal, stopping the supply of electric power to at least one of the frequency converting unit and the amplifying unit of the first wireless unit.

12. The communication control method according to claim 7, wherein the priority information specifies the first radio signal as the priority radio signal when a high transmission rate is requested, and specifies the second radio signal as the priority radio signal when low power consumption is requested.

* * * * *